US012181630B2

(12) United States Patent
Kusaka et al.

(10) Patent No.: US 12,181,630 B2
(45) Date of Patent: Dec. 31, 2024

(54) LOW-REFRACTIVE-INDEX FILM, LAMINATE, OPTICAL ELEMENT, WINDBREAK MATERIAL, AND DISPLAY DEVICE

(71) Applicant: Nippon Sheet Glass Company, Limited, Tokyo (JP)

(72) Inventors: Satoru Kusaka, Tokyo (JP); Koichiro Nakamura, Kanagawa (JP); Hisao Imai, Mie (JP); Hiroyuki Tanaka, Kanagawa (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 153 days.

(21) Appl. No.: 17/904,905

(22) PCT Filed: Feb. 1, 2021

(86) PCT No.: PCT/JP2021/003525
§ 371 (c)(1),
(2) Date: Aug. 24, 2022

(87) PCT Pub. No.: WO2021/171912
PCT Pub. Date: Sep. 2, 2021

(65) Prior Publication Data
US 2023/0110637 A1    Apr. 13, 2023

(30) Foreign Application Priority Data

Feb. 28, 2020  (JP) .................. 2020-033841

(51) Int. Cl.
*G02B 1/118*    (2015.01)
*B32B 17/06*    (2006.01)

(52) U.S. Cl.
CPC .............. *G02B 1/118* (2013.01); *B32B 17/06* (2013.01); *B32B 2255/20* (2013.01);
(Continued)

(58) Field of Classification Search
CPC .......... G02B 1/118; G02B 1/14; G02B 1/111; G02B 1/11; G02B 1/10; G02B 2207/107;
(Continued)

(56) References Cited

U.S. PATENT DOCUMENTS 6,465,108 B1    10/2002  Kamitani et al.
2005/0195486 A1  9/2005  Sasaki et al.
(Continued)

FOREIGN PATENT DOCUMENTS

CN    104669717 A    6/2015
CN    104914488 A    9/2015
(Continued)

OTHER PUBLICATIONS

International Search Report and Written Opinion issued for International Patent Application No. PCT/JP2021/003525, Date of mailing: Mar. 23, 2021, 9 pages including English translation of Search Report.

(Continued)

*Primary Examiner* — Nancy R Johnson
(74) *Attorney, Agent, or Firm* — HSML P.C.

(57) ABSTRACT

A low-refractive-index film 10 includes a first layer 11 and a second layer 12. The first layer 11 is adjacent to a substrate 20. The low-refractive-index film 10 has a refractive index of greater than or equal to 1.01 and less than or equal to 1.30. The first layer 11 and the second layer 12 each include hollow particles 13 and a binder 14. The first layer 11 satisfies, for example, at least one selected from a group of conditions (I) and (II) described below.

(I) A number density $\rho v1$ of voids 15 each having a cross-sectional area of greater than or equal to 1000 $nm^2$ is greater than or equal to $5/\mu m^2$ and less than or equal to $100/\mu m^2$ on a cross-section of the first layer 11.

(Continued)

(II) A ratio of a cross-sectional area of the voids 15 on the cross-section to a total area of the cross-section of the first layer 11 is greater than or equal to 5% and less than or equal to 70%.

15 Claims, 4 Drawing Sheets

(52) U.S. Cl.
 CPC ....... *B32B 2255/28* (2013.01); *B32B 2457/20* (2013.01); *B32B 2551/00* (2013.01)

(58) Field of Classification Search
 CPC ............. G02B 2207/109; B32B 17/06; B32B 2255/20; B32B 2255/28; B32B 2457/20; B32B 2551/00; B32B 5/14; B32B 5/145; B32B 5/22; B32B 5/30; B32B 7/02; B32B 7/022; B32B 7/023; C09D 5/006
 See application file for complete search history.

(56) References Cited

U.S. PATENT DOCUMENTS

| | | |
|---|---|---|
| 2013/0034711 A1 | 2/2013 | Amano et al. |
| 2013/0222916 A1 | 8/2013 | Ogane |
| 2015/0140316 A1* | 5/2015 | Steiner ................... B05D 1/305 |
| | | 427/407.1 |
| 2015/0259569 A1 | 9/2015 | Ogane |
| 2016/0025899 A1* | 1/2016 | Ishizeki ................... G02B 1/18 |
| | | 428/141 |
| 2019/0025467 A1 | 1/2019 | Byun et al. |
| 2019/0310394 A1* | 10/2019 | Miyamoto ............... G02B 1/18 |

FOREIGN PATENT DOCUMENTS

| | | | |
|---|---|---|---|
| CN | 109298470 A | 2/2019 | |
| EP | 3373048 A1 * | 9/2018 | ............. B05D 3/007 |
| JP | H11269657 A | 10/1999 | |
| JP | 2006145709 A | 6/2006 | |
| JP | 2009211078 A | 9/2009 | |
| JP | 2012108320 A | 6/2012 | |
| JP | 2012185413 A | 9/2012 | |
| JP | 2013033124 A | 2/2013 | |

OTHER PUBLICATIONS

Extended European Search Report issued for European Patent Application No. 21759784.8, dated Feb. 27, 2024, 9 pages.

* cited by examiner

LOW-REFRACTIVE-INDEX FILM, LAMINATE, OPTICAL ELEMENT, WINDBREAK MATERIAL, AND DISPLAY DEVICE

TECHNICAL FIELD

The present invention relates to a low-refractive-index film, a laminate, an optical element, a windshield, and a display device.

BACKGROUND ART

To date, an antireflection film obtained by coating a transparent target article or substrate with a material having a predetermined refractive index for reducing reflection of light from the surface thereof, has been known. Particularly, it is important to form an antireflection film on the surface in fields and usage for optical elements such as lenses and filters, windows and structural materials used for buildings and the like, automobile windshields, shields such as helmets and goggles, and the like in order to reduce light reflected from the surface thereof and increase an amount of light transmitted through the article or the substrate. For example, a reflectance of one surface of glass is about 4 to 5% in general. Therefore, the total reflectance may be 8 to 10% for an article formed of sheet glass considering reflection at the front face and reflection at the rear face. Light reflected by the surface of a glass lens used together with an imaging device such as a camera is repeatedly reflected or refracted in the device or at other lens surfaces, and this may cause an undesirable phenomenon such as ghost or flare. Therefore, it is important to form an antireflection film on a surface of an article or a substrate that functions to, for example, transmit light therethrough or refract light, and reduce reflection at the surface.

According to theory of light reflection, in a case where a refractive index of a material of an antireflection film is less than a refractive index (ideally, square root of a refractive index of an article to be coated therewith) of a substrate to be coated therewith, reduction of reflected light is expected to be facilitated. However, a refractive index of a material formed of a single substance is not sufficiently low, and a configuration of a multilayer film in which a plurality of layers having different refractive indexes are laminated and a configuration including a film called a low-refractive-index film which contains a substance such as hollow particles for exhibiting an effect of reducing a refractive index and reduces a refractive index of the entire film, have been conventionally known.

For example, Patent Literature 1 discloses an antireflection film in which hollow particles are bound by a binder. The binder contains voids each having a cross-sectional area of less than 1000 $nm^2$ and voids each having a cross-sectional area of greater than or equal to 1000 $nm^2$. The number of the voids each having a cross-sectional area of greater than or equal to 1000 $nm^2$ in the binder, is less than or equal to 10 voids/$\mu m^2$ with respect to 1 $\mu m^2$ of a cross-sectional area of the binder. In the examples, an antireflection film is formed on a glass substrate BK7 and a refractive index of the antireflection film is 1.27.

Patent Literature 2 discloses an optical element in which an antireflection film is formed on a substrate. The antireflection film includes a low-refractive-index layer in which hollow particulates having hollow holes thereinside are bound to each other by a binder. The low-refractive-index layer includes a first layer as a top layer, and a second layer positioned on the substrate side so as to be adjacent to the first layer. A filling rate of the binder in the first layer is less than a filling rate of the binder in the second layer.

CITATION LIST

Patent Literature

Patent Literature 1: JP 2012-108320 A
Patent Literature 2: JP 2013-033124 A

SUMMARY OF INVENTION

Technical Problem

According to Patent Literature 1, a quantitative state of the voids in a portion positioned near the glass substrate BK7 is unclear in the antireflection film. Meanwhile, Patent Literature 2 indicates that the filling rate of the binder is high in the second layer and does not indicate that voids are present in the second layer. Therefore, a refractive index of the second layer is likely to be relatively high.

Based on such circumstances, there is room for reviewing the techniques disclosed in Patent Literatures 1 and 2 from the viewpoint of enhancement of antireflection performance. Therefore, the present invention provides a novel low-refractive-index film that is advantageous from the viewpoint of exhibiting high antireflection performance.

Solution to Problem

The present invention is directed to
a low-refractive-index film including a first layer and a second layer adjacent to the first layer,
the low-refractive-index film having a refractive index greater than or equal to 1.01 and less than or equal to 1.30,
the first layer and the second layer each including hollow particles and a binder,
the first layer having a thickness less than or equal to half a thickness of the low-refractive-index film and less than or equal to 200 nm, wherein
the first layer has voids so as to satisfy at least one selected from a group of conditions (I) and (II) described below,
(I) a number density of the voids each having a cross-sectional area of greater than or equal to 1000 $nm^2$ is greater than or equal to 5/$\mu m^2$ and less than or equal to 100/$\mu m^2$ on a cross-section of the first layer, and
(II) a ratio of a cross-sectional area of the voids on the cross-section to an area of the cross-section of the first layer is greater than or equal to 5% and less than or equal to 70%.
Furthermore, the present invention is directed to
a laminate sequentially including a substrate and the above-described low-refractive-index film, in which
the first layer is closer to the substrate than the second layer is.

Advantageous Effects of Invention

The above-described low-refractive-index film is advantageous from the viewpoint of exhibiting high antireflection performance.

DESCRIPTION OF EMBODIMENTS

Embodiments of the present invention will be described below with reference to the accompanying drawings. The following description is for illustrating examples of the present invention, and the present invention is not limited to the embodiments described below. In the description herein, it is to be understood that "antireflection" has an action of preventing reflection of light from a surface or an action of reducing reflection even if reflection is not eliminated as compared with a case where a structure for antireflection is absent, and "film" is equivalent to coating, and layer.

Figure 1:
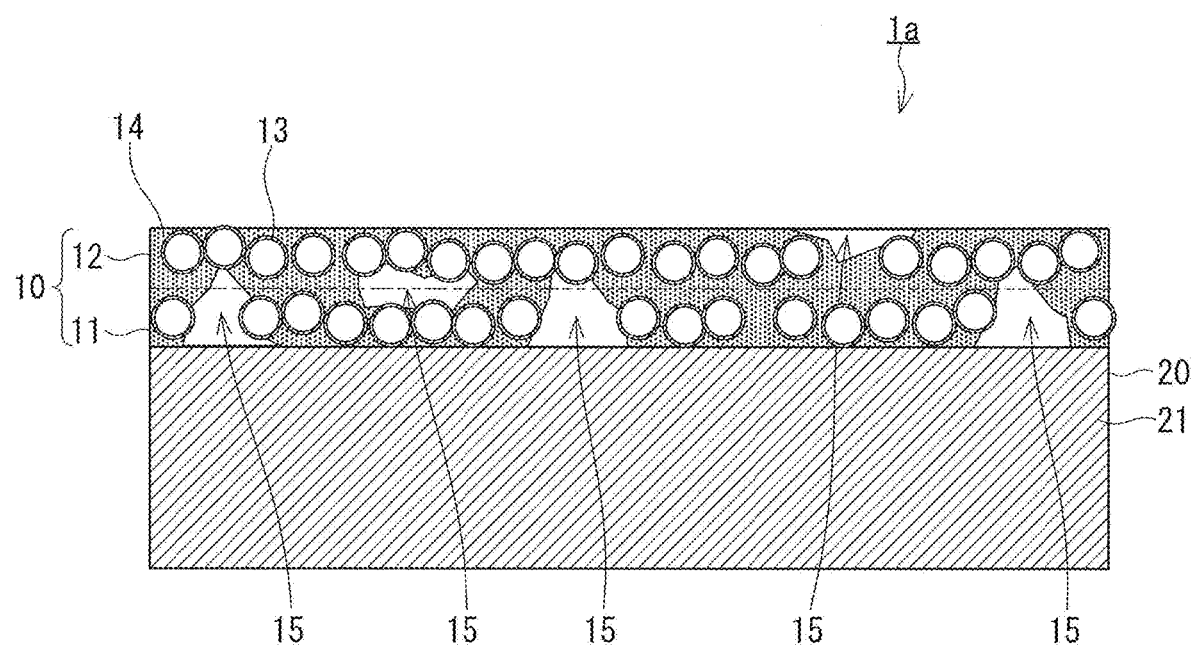
FIG. 1 is a cross-sectional view of an example of a laminate according to the present invention.

As illustrated in FIG. 1, a low-refractive-index film 10 is a film formed along the surface of a substrate 20. The low-refractive-index film 10 includes a first layer 11 and a second layer 12. The first layer 11 is positioned closer to a substrate 20 in the thickness direction of the low-refractive-index film 10. The second layer 12 is positioned adjacent to the first layer 11 so as to be farther from the substrate 20 in the thickness direction of the low-refractive-index film 10. The low-refractive-index film 10 has a refractive index of greater than or equal to 1.01 and less than or equal to 1.30. In the description herein, "refractive index" refers to an absolute refractive index, and, for example, corresponds to a value measured at 25° C. by using the sodium D line. The refractive index of the low-refractive-index film 10 can be determined by, for example, measurement in accordance with reflectance spectroscopy.

"Substrate" refers to an article which is coated with a low-refractive-index film or an antireflection film, or a part of the article. For example, the "substrate" is, but is not limited to, an optical element (including an acousto-optic device) such as a lens, a mirror, a prism, a diffuser, a planar microlens array, a polarizer, a diffraction grating, a hologram, a light modulation element, a light deflection element, and a filter, a solid state imaging device, a window or windshield for buildings or automobiles, a light-transmissive shield such as a helmet and a goggle, or a display device such as a display and a screen. The coated surface of the "substrate" may be flat, curved, or uneven.

As illustrated in FIG. 1, the first layer 11 and the second layer 12 each include hollow particles 13 and a binder 14. The thickness of the first layer 11 is less than or equal to half the thickness of the low-refractive-index film 10 and less than or equal to 200 nm. The first layer 11 has voids 15 so as to satisfy at least one selected from a group of conditions (I) and (II) described below. The voids 15 are each a space that is present inside the low-refractive-index film 10 or at an interface thereof and is not occupied by the hollow particle 13 and the binder 14. For example, the internal space of the hollow particle 13 does not correspond to the void 15. For example, air is present in the voids 15.

(I) On a cross-section S1 of the first layer 11, a number density $\rho v1$ of the voids 15 each having a cross-sectional area of greater than or equal to 1000 $nm^2$, is greater than or equal to 5/$\mu m^2$ and less than or equal to 100/$\mu m^2$.

(II) A ratio (Av1/At1) of a cross-sectional area (Av1) of the voids 15 on the cross-section S1 relative to an area (At1) of the cross-section S1 of the first layer 11 is greater than or equal to 5% and less than or equal to 70%.

In a case where the first layer 11 satisfies at least one selected from the group of the conditions (I) and (II), the voids 15 in the first layer 11 are in a desired quantitative state, and the first layer 11 is likely to have a low refractive index in the low-refractive-index film 10. As a result, the low-refractive-index film 10 is likely to exhibit high antireflection performance. The voids 15 can be formed inside the first layer 11 or at an interface between the low-refractive-index film 10 and another member.

Regarding the condition (I), "the void 15 having a cross-sectional area of greater than or equal to 1000 $nm^2$" indicates that one void 15 defined by a boundary between the void 15 and a substance around the void 15 on the cross-section S1 has a cross-sectional area of greater than or equal to 1000 $nm^2$. In a case where the number density $\rho v1$ is obtained, the cross-section S1 is set as a region surrounded by a rectangular shape having a length (width) of 1000 nm (1 $\mu m$) along the surface of the substrate 20 and a height corresponding to a thickness d1 of the first layer 11 on the cross-section of the laminate including the first layer 11, and the number of the voids 15 each having a cross-sectional area of greater than or equal to 1000 $nm^2$ in the cross-section S1, is counted. The counted number is divided by the area At1 of the cross-section S1 to obtain the number density $\rho v1$. In a case where the number density $\rho v1$ is obtained, voids which are completely included in the region of the cross-section S1, voids in each of which a part of the boundary thereof is a part of the surface of the substrate or an underlayer, and voids each of which is partially included in the cross-section S1, are also counted. In a case where the number density $\rho v1$ is greater than or equal to 5/$\mu m^2$, the first layer 11 is likely to have a low refractive index in the low-refractive-index film 10. In addition, even when difference between a coefficient of expansion of the substrate 20 and a coefficient of expansion of the low-refractive-index film 10 is great, risk of causing crack or cleavage in the low-refractive-index film 10 due to temperature change is likely to be reduced. The number density $\rho v1$ is desirably greater than or equal to 6/$\mu m^2$, more desirably greater than or equal to 8/$\mu m^2$, and even more desirably greater than or equal to 10/$\mu m^2$. In a case where the number density $\rho v1$ is less than or equal to 100/$\mu m^2$, the low-refractive-index film 10 is likely to have a mechanical strength as desired. In addition, increase of scattering of incident light such as visible light is easily prevented, and haze of an article having the low-refractive-index film 10 is easily maintained to be low. The number density $\rho v1$ is desirably less than or equal to 99/$\mu m^2$, more desirably less than or equal to 90/$\mu m^2$, and even more desirably less than or equal to 85/$\mu m^2$. The number density $\rho v1$ may be less than or equal to 75/$\mu m^2$ and less than or equal to 50/$\mu m^2$.

Regarding the condition (II), the ratio (Av1/At1) represented by a percentage is also referred to as void rate Vv1 [%]. In a case where the void rate Vv1 is obtained, the sum of the areas of the voids 15 each having a cross-sectional area of greater than or equal to 1000 $nm^2$ in the cross-section S1, is represented by Av1. In a case where the sum Av1 of the areas of the voids 15 is obtained, Av1 is obtained in consideration of areas of portions present in the region of the cross-section S1, for areas of voids which are completely included in the region of the cross-section S1 and voids each of which is partially included in the region of the cross-section S1. In a case where the void rate Vv1 is greater than or equal to 5%, the first layer 11 is likely to have a low refractive index in the low-refractive-index film 10. In addition, even when difference between a coefficient of expansion of the substrate 20 and a coefficient of expansion of the low-refractive-index film 10 is great, risk of causing a crack or cleavage in the low-refractive-index film 10 due to temperature change is likely to be reduced. The void rate Vv1 is desirably greater than 5%, more desirably greater than or equal to 9%, and even more desirably greater than or equal to 10%. In a case where the void rate Vv1 is less than or equal to 70%, the low-refractive-index film 10 is likely to have a mechanical strength as desired. The void rate Vv1 is desirably less than 70% and more desirably less than or equal to 65%. The void rate Vv1 may be less than or equal to 50% and may be less than or equal to 30%.

When the first layer 11 satisfies the above-described condition (I), for example, the number density ρv1 is greater than a number density ρv2 of the voids 15 each having a cross-sectional area of greater than or equal to 1000 nm² on a cross-section S2 of the second layer 12 extending along the surface of the substrate 20. Thus, in the low-refractive-index film 10, the first layer 11 is likely to more assuredly have a low refractive index. In a case where the number density ρv2 is obtained, the number of the voids 15 each having a cross-sectional area of greater than or equal to 1000 nm² in the cross-section S2 surrounded by a rectangular shape having a length (width) of 1000 nm (1 μm) along the surface of the substrate 20 and a height corresponding to a thickness d2 (=dt−d1) of the second layer 12 on the cross-section of the laminate including the second layer 12, is counted. The counted number is divided by an area At2 of the cross-section S2 to obtain the number density ρv2. In a case where the number density ρv2 is obtained, voids in each of which a part of the boundary thereof is a part of the surface opposing the surface in contact with the first layer 11, in the second layer 12, and voids each of which is partially included in the region of the cross-section S2 as well as the voids which are completely included in the region of the cross-section S2, are also counted. The sum of areas of the voids 15 each having a cross-sectional area of greater than or equal to 1000 nm² in the cross-section S2, is represented by Av2. In a case where the sum Av2 of the areas of the voids 15 is obtained, Av2 is obtained in consideration of areas of portions present in the region of the cross-section S2, for areas of voids which are completely included in the region of the cross-section S2 and voids each of which is partially included in the region of the cross-section S2.

When the first layer 11 satisfies the above-described condition (II), the ratio (Av1/At1) is, for example, greater than a ratio (Av2/At2). The ratio (Av2/At2) is a ratio, represented by a percentage, of a cross-sectional area Av2 of the voids 15 on the cross-section S2 of the second layer 12 relative to the total area At2 of the cross-section S2 of the second layer 12 having a length of 1000 nm and extending along the surface of the substrate 20. Thus, in the low-refractive-index film 10, the first layer 11 is likely to more assuredly have a low refractive index.

The cross-section S1 and the cross-section S2 are each typically a cross-section formed by cutting the low-refractive-index film 10 along the plane parallel to the line normal to the surface of the substrate 20. The cross-sectional view in the accompanying drawings or a cross-section indicated in an electron micrograph corresponds to such a cross-section.

The first layer 11 and the second layer 12 are distinguished from each other by a boundary surface orthogonal to the line normal to the surface of the substrate 20. Typically, the first layer 11 corresponds to a portion that is closer to the substrate 20 than the boundary surface is, in the thickness direction of the low-refractive-index film 10, and the second layer 12 corresponds to a portion that is farther from the substrate 20 than the boundary surface is, in the thickness direction of the low-refractive-index film 10. The boundary surface may be an actual one or an imaginary one. For example, the binder 14 may form a continuous phase in the first layer 11 and the second layer 12.

For example, the low-refractive-index film 10 has a thickness dt of greater than or equal to 70 nm. For example, when 70 nm≤dt≤400 nm is satisfied, the thickness d1 of the first layer 11 is equal to dt/2. For example, when 400 nm<dt is satisfied, the thickness d1 of the first layer 11 is equal to 200 nm. In a case where the first layer 11 having such a thickness satisfies at least one selected from the group of the conditions (I) and (II), the low-refractive-index film 10 is likely to more assuredly exhibit high antireflection performance.

The refractive index of the low-refractive-index film 10 is desirably greater than or equal to 1.05 and less than or equal to 1.28 and more desirably greater than or equal to 1.10 and less than or equal to 1.25.

A material of the binder 14 is not limited to a specific material. The material of the binder 14 is, for example, a material that satisfies characteristics as desired from the viewpoint of environmental resistance, abrasion resistance, adhesion to the substrate, and the like. The material of the binder 14 is desirably a material that has high transparency with respect to light in a predetermined wavelength range used for an article having the low-refractive-index film 10. The predetermined wavelength range used for an article having the low-refractive-index film 10 can be present in a visible light region or a near-infrared region.

The binder 14 contains, for example, silica, silsesquioxane, or a mixture of silica and silsesquioxane. In this case, in the binder 14, the wavelength range that allows transparency to be ensured in the visible light region, is likely to be wide. In addition, the refractive index of the binder 14 can be reduced to a certain degree.

The binder 14 may contain, for example, a predetermined curable resin according to a kind of the substrate 20 or performance required for an article having the low-refractive-index film 10. Although the curable resin is in the form of liquid in the case of being applied to the surface of the substrate 20, the resin is cured by a method such as heating and light energy irradiation after being applied, whereby production of the low-refractive-index film 10 is likely to be easy. Examples of the curable resin include phenol resins, epoxy resins, melamine resins, unsaturated polyester resins, polyurethane resins, polyimide resins, acrylic resins, and silicone-based resins.

In a case where the binder 14 contains silica, silsesquioxane, or a mixture of silica and silsesquioxane, for example, at least one selected from a group of a condition of 1%≤$W_{Si}$≤60% and a condition of 5%≤$W_{Sq}$≤90% is satisfied. $W_{Si}$ represents a ratio of a mass of silica contained in the binder 14 to a mass of a solid content of the low-refractive-index film 10. $W_{Sq}$ represents a ratio of a mass of silsesquioxane contained in the binder 14 to the mass of the solid content of the low-refractive-index film 10. At least one selected form a group of a condition of 5%≤$W_{Si}$≤60% and a condition of 8%≤$W_{Sq}$≤80% is desirably satisfied, and at least one selected form a group of a condition of 8%≤$W_{Si}$≤30% and a condition of 10%≤$W_{Sq}$≤60% is more desirably satisfied.

In a case where the binder 14 contains silica, silsesquioxane, or a mixture of silica and silsesquioxane, for example, a condition of 5%≤Wb≤90% is satisfied. Wb represents a ratio of the sum of the masses of silica and silsesquioxane contained in the binder 14 to the mass of the solid content of the low-refractive-index film 10. A condition of 10%≤Wb≤85% is desirably satisfied, and a condition of 20%≤Wb≤80% is more desirably satisfied. Silica in the binder 14 is, for example, obtained by hydrolysis and condensation polymerization of tetrafunctional alkoxysilane. Silsesquioxane in the binder 14 is, for example, obtained by hydrolysis and condensation polymerization of trifunctional alkoxysilane.

The hollow particles 13 are typically particles each having a hollow hole defined by a shell. In a case where the low-refractive-index film 10 contains the hollow particles 13, the refractive index of the low-refractive-index film 10 is likely to be low.

An average particle diameter $d_e$ of the hollow particles 13 is not limited to a specific value. The average particle diameter $d_e$ of the hollow particles 13 is, for example, greater than or equal to 20 nm and less than or equal to 100 nm. In a case where the average particle diameter $d_e$ is greater than or equal to 20 nm, the hollow holes in the hollow particles 13 are likely to have volumes as desired. Thus, the refractive index of the low-refractive-index film 10 is likely to be low. In a case where the average particle diameter $d_e$ is less than or equal to 100 nm, the amount of scattering of light is unlikely to be large. The average particle diameter $d_e$ of the hollow particles 13 is, for example, an average particle diameter in a number-based particle size distribution.

The average particle diameter $d_e$ of the hollow particles 13 is desirably greater than or equal to 25 nm and less than or equal to 90 nm and more desirably greater than or equal to 30 nm and less than or equal to 80 nm.

A material of the shell of the hollow particle 13 is not limited to a specific material. Examples of the material of the shell of the hollow particle 13 include inorganic compounds such as $SiO_2$, $ZrO_2$, and $MgF_2$, fluorine-based compounds such as polytetrafluoroethylene (PTFE) and tetrafluoroethylene-perfluoroalkylvinyl ether copolymer (PFA), and polymers of resin. The material of the shell of the hollow particle 13 desirably has a low refractive index, for example, has a refractive index less than or equal to the refractive index of $SiO_2$.

A thickness of the shell of the hollow particle 13 is not limited to a specific value. The thickness of the shell of the hollow particle 13 is, for example, greater than or equal to 5 nm and less than or equal to 20 nm and desirably greater than or equal to 10 nm and less than or equal to 20 nm.

A ratio Whp [%] of a mass of the hollow particles 13 to the mass of the solid content of the low-refractive-index film 10 is not limited to a specific value. The ratio Whp is, for example, greater than or equal to 5% and less than or equal to 90%, desirably greater than or equal to 10% and less than or equal to 85%, and more desirably more than or equal to 20% and less than or equal to 80%.

A relationship between a content of the hollow particles 13 and a content of the binder 14 in the low-refractive-index film 10 is not limited to a specific one. The low-refractive-index film 10 satisfies, for example, a condition of 0.2<Wb/Whp<20. In a case where the condition of Wb/Whp<20 is satisfied, the refractive index of the low-refractive-index film 10 is likely to be reduced. In addition, even when a difference between the coefficient of expansion of the substrate 20 and the coefficient of expansion of the low-refractive-index film 10 is great, a crack or cleavage in the low-refractive-index film 10 due to temperature change is unlikely to be caused. In a case where the condition of 0.2<Wb/Whp is satisfied, the low-refractive-index film 10 is likely to have a mechanical strength as desired, and it can be expected that breakage of the low-refractive-index film 10 or separation of the low-refractive-index film 10 is unlikely to be caused.

The low-refractive-index film 10 desirably satisfies a condition of 0.3<Wb/Whp<15, more desirably satisfies a condition of 0.4<Wb/Whp<12, and even more desirably satisfies a condition of 0.5<Wb/Whp<10.

The low-refractive-index film 10 may contain a functional component such as a light absorber as necessary. Thus, the low-refractive-index film 10 can exhibit an additional function corresponding to the functional component. Examples of the light absorber include ultraviolet absorbers and infrared absorbers. The ultraviolet absorber is not limited to a specific ultraviolet absorber. Examples of the ultraviolet absorber include benzophenone-based ultraviolet absorbers, benzotriazole-based ultraviolet absorbers, and triazine-based ultraviolet absorbers. The infrared absorber is not limited to a specific infrared absorber. Examples of the infrared absorber include squarylium-based infrared absorbers, diimonium-based infrared absorbers, cyanin-based infrared absorbers, phthalocyanine-based infrared absorbers, azo-based infrared absorbers, and a phosphoric acid-metal compound containing a phosphoric acid derivative such as phosphonic acid and phosphoric ester, and a metal component such as copper.

As illustrated in FIG. 1, for example, a laminate 1a including the low-refractive-index film 10 can be provided. The laminate 1a includes the substrate 20 and the low-refractive-index film 10. In the laminate 1a, the low-refractive-index film 10 is formed along the surface of the substrate 20.

The low-refractive-index film 10 is, for example, in contact with the surface of the substrate 20.

As illustrated in FIG. 1, in the laminate 1a, the low-refractive-index film 10 is, for example, formed in contact with one principal surface of the substrate 20. The low-refractive-index films 10 may be, for example, formed in contact with both principal surfaces of the substrate 20.

The substrate 20 may be a plate-like member having a planar surface, a member such as a lens having a curved surface, a member such as a diffraction grating including an uneven surface, or a member such as a microlens array and a diffuser which includes a surface having minute unevenness. The substrate 20 may be a member having a surface defined by a combination of these surfaces.

The substrate 20 is an article to be coated with a low-refractive-index film or an antireflection film, or a part of the article, and is not limited to an article having a specific function. The substrate 20 may be, for example, an optical element (including an acousto-optic device) such as a lens, a mirror, a prism, a diffuser, a planar microlens array, a polarizer, a diffraction grating, a hologram, a light modulation element, a light deflection element, and a filter, a solid state imaging device, a window or windshield for buildings or automobiles, a light transmissive shield such as a helmet and a goggle, or a display device such as a display and a screen. In a case where the low-refractive-index film 10 is used for preventing reflection, light transmissivity is likely to be high in the laminate 1a.

As illustrated in FIG. 1, the substrate 20 includes, for example, the plate-like substrate 21 having two principal surfaces facing each other. A material of the substrate 21 is not limited to a specific material. Examples of the material of the substrate 21 include glass, resins, and semiconductor materials such as silicon. Examples of the glass include soda glass, borosilicate glass, aluminoborosilicate glass, fluorophosphate glass, phosphate glass, and multicomponent optical glass having enhanced optical characteristics such as a refractive index. Examples of the resin include polyolefin-based resins, polycarbonate-based resins, polyimide-based resins, epoxy-based resins, acrylic resins, polyether-based resins, polyimide-based resins, polyurethane-based resins, and silicone-based resins.

The arithmetic average roughness Ra of the surface of the substrate 20 is determined in accordance with Japanese Industrial Standards (JIS) B 0601-1994 and is not limited to a specific value. The arithmetic average roughness Ra of the surface of the substrate 20 is, for example, greater than or equal to 0.3 nm and less than or equal to 140 nm. In a case where the arithmetic average roughness Ra of the surface of the substrate 20 is greater than or equal to 0.3 nm, the adhesion between the substrate 20 and the low-refractive-index film 10 is likely to be good. Therefore, even when the first layer 11 has the voids 15, the low-refractive-index film 10 is unlikely to be separated from the substrate 20. In a case where the arithmetic average roughness Ra of the surface of the substrate 20 is less than or equal to 140 nm, the film thickness of the low-refractive-index film 10 is unlikely to spatially vary, and functions to be exhibited by the low-refractive-index film 10 are unlikely to vary in a plane. In addition, degradation of effective light transmissivity due to a phenomenon such as scattering of light can be prevented in the laminate 1a.

The arithmetic average roughness Ra of the surface of the substrate 20 is desirably greater than or equal to 0.4 nm and less than or equal to 100 nm, more desirably greater than or equal to 0.5 nm and less than or equal to 50 nm, and even more desirably greater than or equal to 0.5 nm and less than or equal to 35 nm.

The arithmetic average roughness Ra of the surface of the substrate 20 and a wavelength $\lambda_i$ [nm] of light incident on the laminate 1a satisfy, for example, a relationship of $Ra \leq \lambda_i/4$. Thus, light is unlikely to be scattered in the laminate 1a. For example, in a case where incident light is visible light having a wavelength of 550 nm, when a relationship of $Ra \leq 550/4$ [nm]=137.5 nm is satisfied, reduction of transmissivity due to scattering of light can be prevented.

The arithmetic average roughness Ra of the surface of the substrate 20 and the average particle diameter $d_e$ of the hollow particles 13 satisfy, for example, a relationship of $Ra \leq d_e$. Thus, the hollow particles 13 are likely to be uniformly dispersed in the low-refractive-index film 10. For example, in a case where the average particle diameter $d_e$ of the hollow particles 13 is 50 nm, a relationship of $Ra \leq 50$ nm is desirably satisfied.

A contact angle $\alpha$ of a water droplet on the surface of the substrate 20 is not limited to a specific value. Meanwhile, by adjusting wettability of the surface of the substrate 20, the voids 15 are likely to be formed in the low-refractive-index film 10 near an interface between the low-refractive-index film 10 and the substrate 20.

The contact angle $\alpha$ of a water droplet on the surface of the substrate 20 is, for example, greater than or equal to 5° and less than or equal to 140°. In a case where the contact angle $\alpha$ is greater than or equal to 5°, a liquid composition as a precursor of the low-refractive-index film 10 is repelled on the surface of the substrate 20, and the voids 15 can be formed in desired states in the first layer 11. In a case where the contact angle $\alpha$ is less than or equal to 140°, the liquid composition as the precursor of the low-refractive-index film 10 can be prevented from being excessively repelled on the surface of the substrate 20, and the low-refractive-index film 10 is likely to have a film thickness as desired. In addition, streaky defects and variation in film thickness are unlikely to occur in the low-refractive-index film 10, and uniform characteristics are likely to be exhibited in the plane of the low-refractive-index film 10.

The arithmetic average roughness Ra of the surface of the substrate 20 and the contact angle $\alpha$ of a water droplet on the surface of the substrate 20 are adjusted by, for example, subjecting the surface of the substrate 20 to predetermined surface treatment. A method for the surface treatment is, for example, a method in which a state of the surface of the substrate 20 is chemically or physically changed by using treatment with chemicals, blasting, or the like. For example, in a method in which minute unevenness is formed in the surface of the substrate 20, a liquid composition as a precursor of the low-refractive-index film 10 is likely to exhibit a physical adhering effect such as an anchor effect on the surface of the substrate 20. Examples of the method for surface treatment may include a method, such as corona treatment, plasma treatment, ultraviolet irradiation, and flame treatment, for changing a state of a chemical bond of a functional group on the surface of the substrate 20. Also in such a method, wettability for the liquid composition as the precursor of the low-refractive-index film 10 on the surface of the substrate 20 can be adjusted. Wettability for the liquid composition as the precursor of the low-refractive-index film 10 on the surface of the substrate 20 may be adjusted also by applying a surface treatment agent such as a primer or a silane coupling agent. In addition, the arithmetic average roughness Ra of the surface of the substrate 20 and the contact angle $\alpha$ of a water droplet on the surface of the substrate 20 may be adjusted also by forming the surface of the substrate 20 with a predetermined layer such as a functional layer and an underlayer.

The substrate 20 may have a predetermined functional layer. In this case, the functional layer is, for example, a layer, a film, or a film-like object such as an antireflection film, a light absorbing film, and a light reflection film for adjusting light transmissivity and reflectivity. The antireflection film is, for example, a monolayer or multilayer dielectric film containing an inorganic material such as $SiO_2$, $MgF_2$, and $TiO_2$. The light reflection film is, for example, a monolayer or multilayer dielectric film containing an inorganic material such as $SiO_2$, $MgF_2$, and $TiO_2$. The light reflection film may be a metal film. The light absorbing film is, for example, a film containing resin in which an infrared absorber or an ultraviolet absorber is incorporated. Examples of the infrared absorber include squarylium-based pigments, diimonium-based pigments, cyanin-based pigments, phthalocyanine-based pigments, azo-based pigments, and a complex containing a phosphorus-containing oxide and a metal such as copper. Examples of the ultraviolet absorber include benzophenone-based pigments, benzotriazole-based pigments, and triazine-based pigments. The functional layer may be a layer, a film, or a film-like object such as an anti-fogging film, a water-repellent film, an oil-repellent film, and a hydrophilic film for adjusting behavior with respect to water or oil in the environment.

The low-refractive-index film 10 can be produced by, for example, applying a predetermined liquid composition to the surface of the substrate 20 to form a coating film, and curing the coating film. The liquid composition can be prepared by, for example, mixing a raw material of the binder 14 and the hollow particles 13. The above-described functional component is added to the liquid composition as necessary.

The liquid composition may contain, for example, a solvent and water. Thus, an object of, for example, adjusting the viscosity of the liquid composition, enhancing dispersibility of the functional component in the liquid composition, or enhancing solubility of the raw material of the binder 14 is likely to be achieved. The solvent is not limited to a specific solvent. Examples of the solvent may include tetrahydrofuran (THF), cyclohexanone, cyclohexane, toluene, xylene, alcohols, phenols, water, glycerin, acetone, methyl ethyl ketone (MEK), diethyl ether, ethyl acetate, and mixtures thereof.

The liquid composition may contain, for example, acid. In a case where the raw material of the binder 14 contains alkoxysilane, the acid acts as a catalyst for reaction such as hydrolysis of alkoxysilane. The acid is not limited to a specific acid. Examples of the acid include formic acid and hydrochloric acid.

The laminate 1a can be modified from various viewpoints. For example, the laminate 1a may be formed as a laminate 1b illustrated in FIG. 2A, a laminate 1c illustrated in FIG. 2B, a laminate 1d illustrated in FIG. 2C, or a laminate 1e illustrated in FIG. 2D. Each of the laminate 1b, the laminate 1c, laminate 1d, and the laminate 1e has the same structure as the laminate 1a except for particularly described portions. The components of the laminate 1b, the laminate 1c, the laminate 1d, or the laminate 1e which are the same as or correspond to the components of the laminate 1a are denoted by the same reference characters, and the detailed description is omitted. The description for the laminate 1a is also applied to the laminate 1b, the laminate 1c, laminate 1d, and the laminate 1e as long as there is no technical contradiction.

Figure 2A:
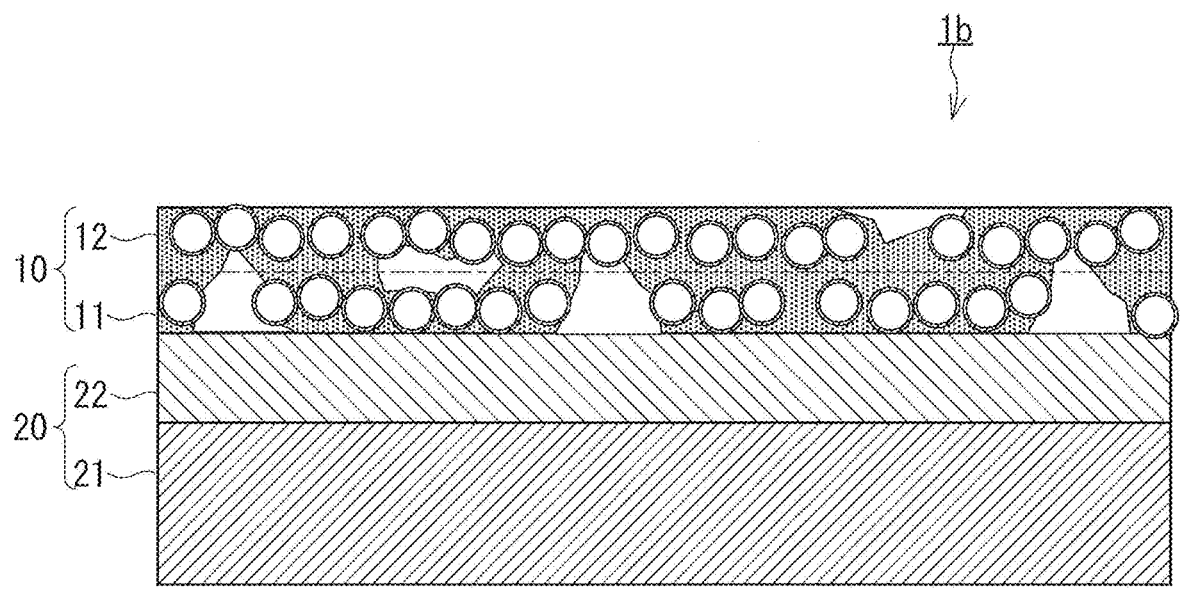
FIG. 2A is a cross-sectional view of another example of a laminate according to the present invention.
Figure 2B:
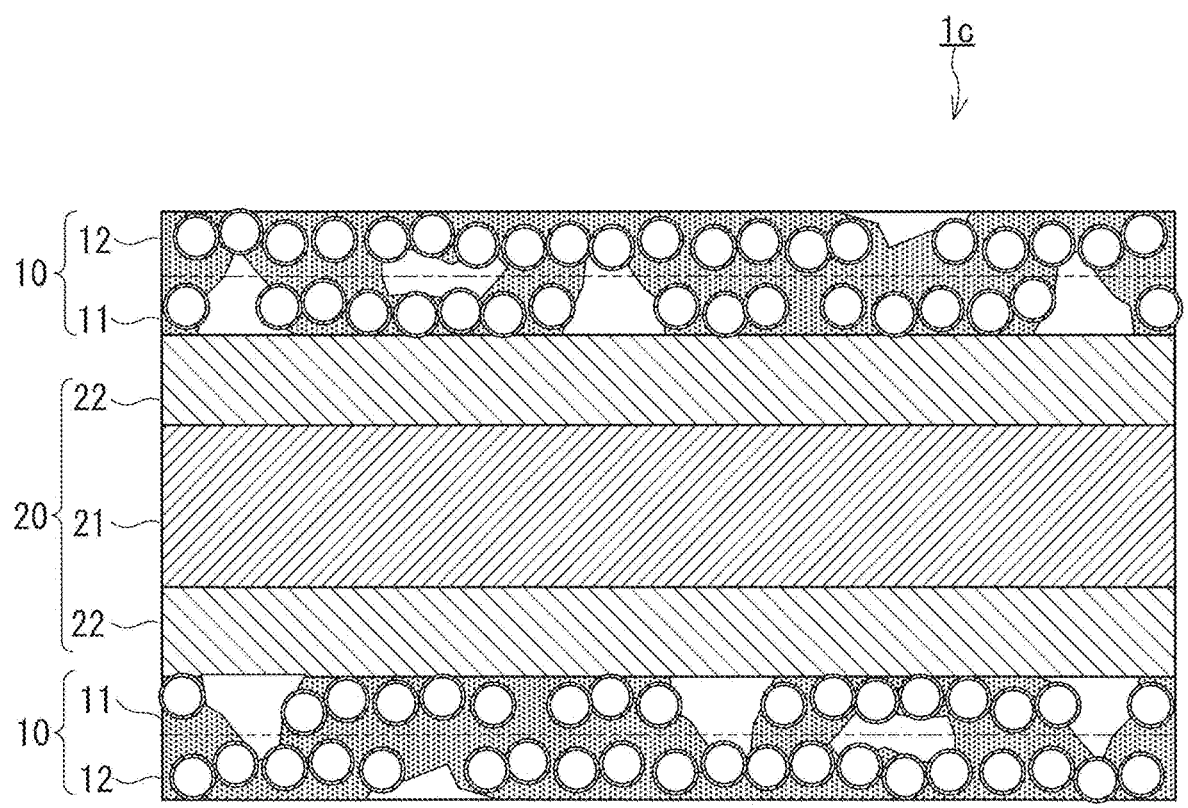
FIG. 2B is a cross-sectional view of still another example of a laminate according to the present invention.

As illustrated in FIG. 2A and FIG. 2B, the substrate 20 of each of the laminates 1b and 1c further includes an underlayer 22. The surface of one principal surface or the surfaces of both principal surfaces of the substrate 20 is formed by the underlayer 22. In the laminate 1b, the low-refractive-index film 10 is formed on the underlayer 22. The surface of the substrate 20 is easily adjusted by the underlayer 22 so as to be in a state suitable for forming the low-refractive-index film 10. For example, the arithmetic average roughness Ra of the surface of the substrate 20 or the contact angle α of a water droplet on the surface of the substrate 20 is easily adjusted so as to be in a desired range.

In the laminate 1c, a pair of the low-refractive-index films 10 is formed on the surfaces of both principal surfaces of the substrate 20. One of the paired low-refractive-index films 10 is formed on the underlayer 22.

The underlayer 22 is not limited to a specific layer. The underlayer 22 contains, for example, at least one selected from a group of silica and silsesquioxane. The underlayer 22 may contain silica, may contain silsesquioxane, or may contain a mixture thereof. The underlayer 22 may contain an inorganic material such as $SiO_2$, $TiO_2$, and $MgF_2$. The underlayer 22 may be a multilayer film in which a plurality of layers formed of the inorganic material are laminated. The underlayer 22 may be a layer containing resin such as a polyolefin-based resin, a polycarbonate-based resin, a polyamide-based resin, an epoxy-based resin, an acrylic resin, a polyether-based resin, a polyimide-based resin, a polyurethane-based resin, a fluorine-based resin, and a silicone-based resin.

As illustrated in FIG. 2A and FIG. 2B, the surface of one principal surface of the substrate 20 is formed by the underlayer 22. Meanwhile, the surfaces of both principal surfaces of the substrate 20 may be formed by the underlayers 22. In this case, the pair of the low-refractive-index films 10 may be formed on the underlayers 22 forming the surfaces of both of the principal surfaces of the substrate 20.

A thickness of the underlayer 22 is not limited to a specific thickness. For example, the underlayer 22 has a thickness of 5 to 50 nm.

Figure 2C:
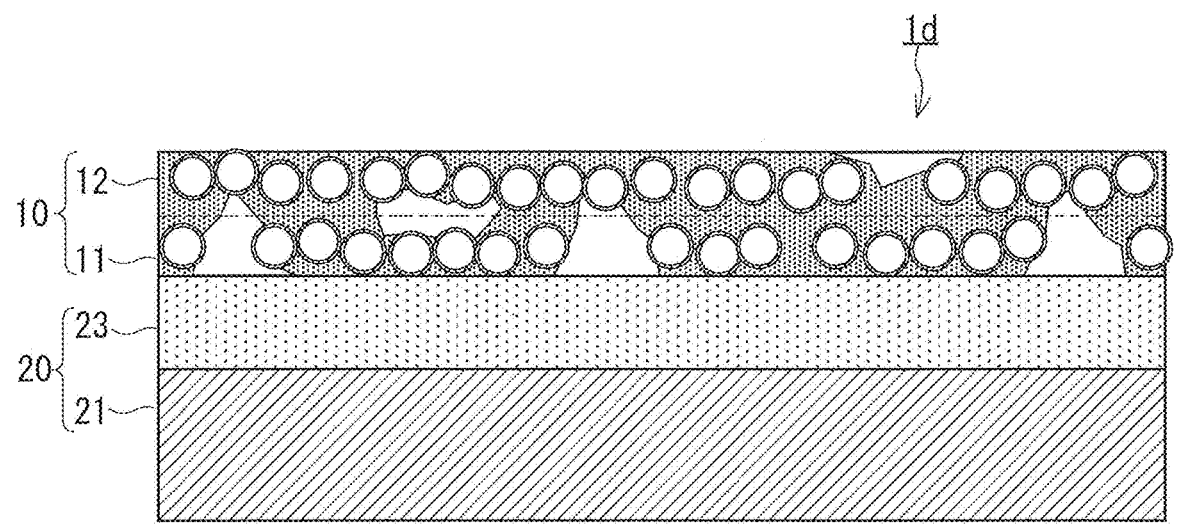
FIG. 2C is a cross-sectional view of still another example of a laminate according to the present invention.
Figure 2D:
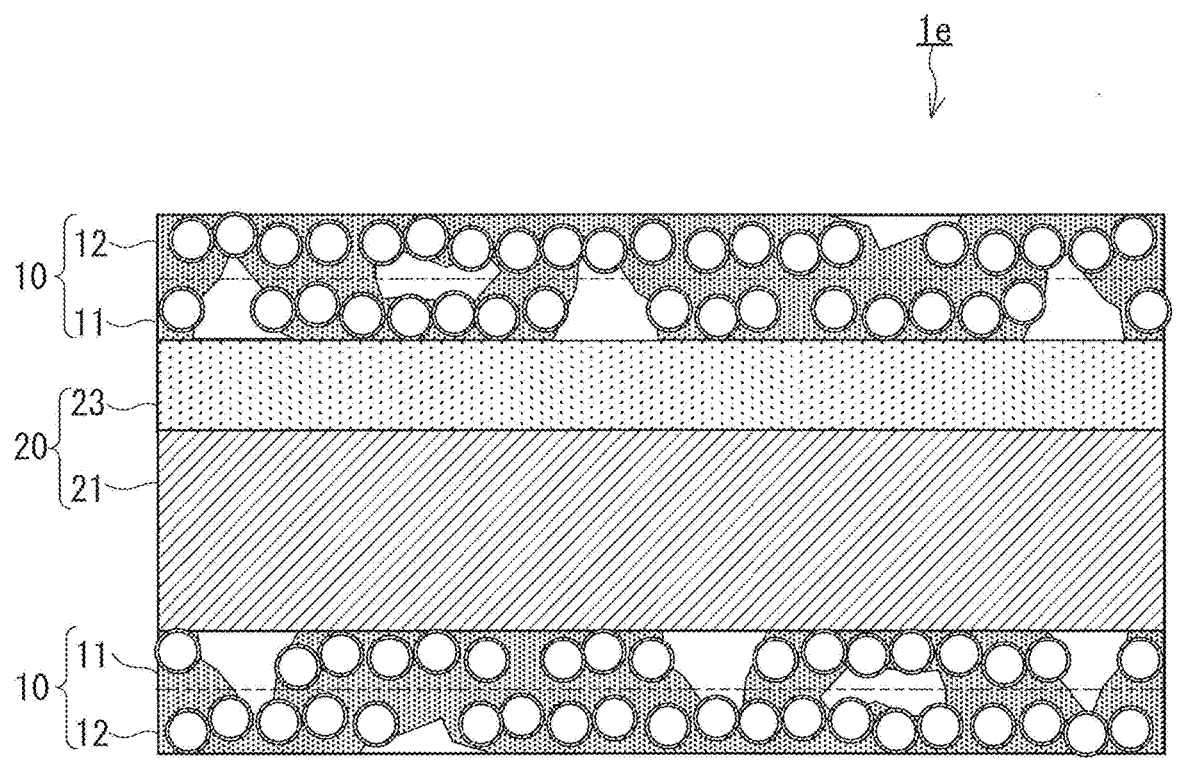
FIG. 2D is a cross-sectional view of still another example of a laminate according to the present invention.
Figure 3:
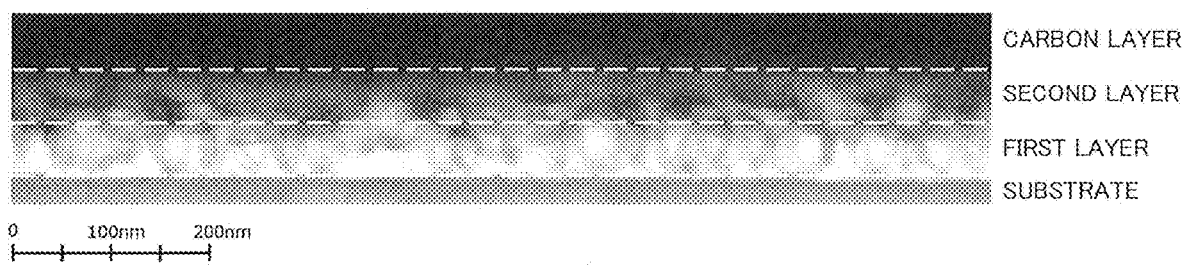
FIG. 3 illustrates a scanning transmission electron microscope (STEM) photograph of a cross-section of a laminate of Example 1.

As illustrated in FIG. 2C and FIG. 2D, the substrate 20 of each of the laminates 1d and 1e further includes a functional layer 23. The surface of one principal surface of the substrate 20 is formed by the functional layer 23. In the laminate 1d, the low-refractive-index film 10 is formed on the functional layer 23. A desired function can be imparted to each of the laminates 1d and 1e by the functional layer 23. In addition, the surface of the substrate 20 can be adjusted also by the functional layer 23 so as to be in a state suitable for forming the low-refractive-index film 10. For example, the arithmetic average roughness Ra of the surface of the substrate 20 or the contact angle α of a water droplet on the surface of the substrate 20 is easily adjusted by the functional layer 23 so as to be in a desired range.

In the laminate 1e, a pair of the low-refractive-index films 10 is formed on the surfaces of both principal surfaces of the substrate 20. One of the paired low-refractive-index films 10 is formed on the functional layer 23.

The functional layer 23 is not limited to a specific layer as long as the functional layer 23 has a predetermined function. The functional layer 23 is, for example, a layer, a film, or a film-like object such as an antireflection film, a light absorbing film, and a light reflection film for adjusting light transmissivity and reflectivity. The antireflection film is, for example, a monolayer or multilayer film containing an inorganic material such as $SiO_2$, $MgF_2$, and $TiO_2$. The light reflection film may contain, for example, a monolayer or multilayer film containing an inorganic material such as $SiO_2$, $MgF_2$, and $TiO_2$, or a metal film formed of metal. The light absorbing film is, for example, a film containing resin in which an infrared absorber or an ultraviolet absorber is incorporated. Examples of the infrared absorber include squarylium-based pigments, diimonium-based pigments, cyanin-based pigments, phthalocyanine-based pigments, azo-based pigments, and a complex containing a phosphorus-containing oxide and a metal such as copper. Examples of the ultraviolet absorber include benzophenone-based pigments, benzotriazole-based pigments, and triazine-based pigments. The light absorbing film may contain a metal film formed of metal.

The functional layer 23 may be a layer, a film, or a film-like object such as an anti-fogging film, a water-repellent film, an oil-repellent film, and a hydrophilic film for adjusting behavior with respect to water or oil in the environment. In other words, each of the laminates 1d and 1e may include the substrate 20, at least one selected from a group of an anti-fogging film, a water-repellent film, an oil-repellent film, and a hydrophilic film formed on the substrate 20, and the low-refractive-index film 10.

As illustrated in FIG. 2C and FIG. 2D, the surface of one principal surface of the substrate 20 is formed by the functional layer 23. Meanwhile, the surfaces of both principal surfaces of the substrate 20 may be formed by the functional layers 23. In this case, the low-refractive-index film 10 may be formed on each of the functional layers 23 forming the surfaces of both principal surfaces of the substrate 20.

Various articles each including the low-refractive-index film 10 can be provided. For example, an optical element having a surface formed by the low-refractive-index film 10 can be provided. A windbreak material including the low-refractive-index film 10 can also be provided. Examples of the windbreak material include window glass and windshields. Furthermore, a display device including the low-refractive-index film 10 can also be provided.

EXAMPLES

The present invention will be described in more detail based on Examples. The present invention is not limited to the following Examples. Firstly, evaluation methods for Examples and Comparative Examples will be described.

<Evaluation of Film Formability>

Film formability of a liquid composition for a low-refractive-index film according to Examples and Comparative Examples with respect to a surface of a substrate according to the Examples and the Comparative Examples was evaluated. In a case where a portion which was not able to be coated with the liquid composition for the low-refractive-index film was confirmed to be present when the liquid composition was applied to the surface of the substrate, or the thickness of the low-refractive-index film was confirmed to be non-uniform, the film formability was evaluated as "F". Meanwhile, in a case where these were not confirmed, the film formability was evaluated as "A". Table 2 indicates the results.

<Reflectance, Refractive Index, and Film Thickness>

The incident angle was adjusted to 12° and a spectral reflectance of the laminate of each of the Examples and the Comparative Examples was measured by using a spectrophotometer (manufactured by Hitachi High-Technologies Corporation, Product name: U-4000). Optical thin film designing software FilmWizard (manufactured by Scientific Computing International) was used to obtain a refractive index and a film thickness of the low-refractive-index film of each of the Examples and the Comparative Examples. Table 2 indicates the spectral reflectance at the D line (wavelength of 589 nm), the refractive index, and the film thickness. In a case where the low-refractive-index film was formed on one principal surface of the substrate in a laminate for which the spectral reflectance was measured, a method in which, for example, a principal surface on which the low-refractive-index film was not formed was painted black over the entire surface, formed as a rough surface, or formed as a matte surface was implemented to use a laminate in which, for example, influence of reflection on the principal surface was able to be ignored. In this case, black paint is not limited to a specific paint, and may be soot-like black paint, or paint called flare-cut and used in the field for optics. As the black paint, for example, GT-1000, GT-2000, GT-7, and CS-37 manufactured by Canon Chemicals Inc. can be used. The matte surface was, for example, formed by using an abrasive having a particle size of greater than or equal to #500 (No. 500). The principal surface having been processed into a matte surface may be thereafter painted black. In a case where the laminate included an underlayer, the film thickness of the underlayer was measured by reflection spectroscopy by using a film thickness measurement system F20-UV manufactured by Filmetrics Japan, Inc. before the low-refractive-index film was formed.

<Haze>

By using a haze meter (manufactured by Suga Test Instruments Co., Ltd., Product name: HZ-V3), haze was measured at three points distant from each other over 1 cm in the laminate of each of the Examples and the Comparative Examples, an average value thereof was obtained, and the average value was set as haze of each of the Examples and the Comparative Examples. Table 2 indicates the results.

<The Number Nv of Voids and Void Rate Vv1>

Figure 4:
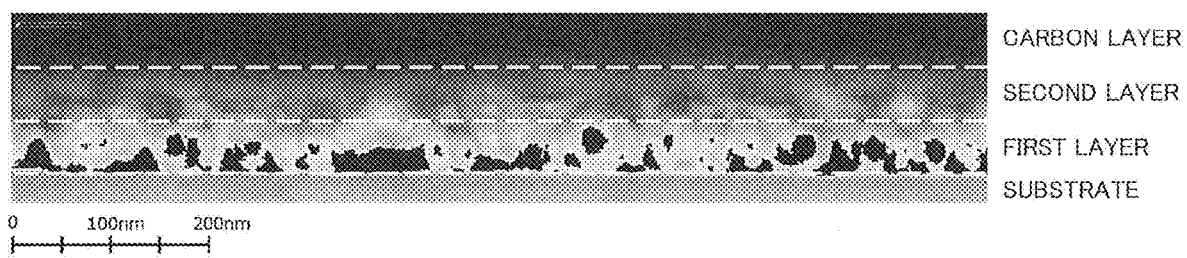
FIG. 4 illustrates a STEM photograph of the cross-section of the laminate of example 1 in which voids are colored black.

In order to check a state of voids in the low-refractive-index film of the laminate of each of the Examples and the Comparative Examples, firstly, cutting with a thickness of 100 nm was performed along a cross-section parallel to the line normal to the surface of the substrate by using a focused ion beam device SM13200F manufactured by SII NanoTechnology Inc. A sample was produced by depositing, on the top surface, carbon with a thickness of 400 to 500 nm. Bright field transmission observation of the cross-section of the sample was performed in 250000× magnification field-of-view by using a scanning transmission electron microscope (STEM) S-5500 manufactured by Hitachi High-Technologies Corporation, and a transmission-photographed image of the laminate including the low-refractive-index film was obtained. The acceleration voltage was 200 kV. In the transmission-photographed image of the laminate, the voids were highlighted in white and observed. The obtained transmission-photographed image of the cross-section of the laminate was converted to numerical values using gradations of 0 to 255, and histogram equalization was performed to obtain an image having a uniform contrast. After that, the gradations of 229 to 255 were set as voids. The number of the voids, the number density, and the cross-sectional area were calculated as follows. Firstly, for the transmission-photographed image of the cross-section of the laminate, a 1000 nm (1 μm) image was obtained along a direction parallel to the surface of the substrate, and the voids were specified based on the above-described method. FIG. 4 illustrates the transmission-photographed image of the cross-section of the laminate and the specified voids. In FIG. 4, the voids were represented in black for easily distinguishing the voids from the other portions. Subsequently, the thickness dt of the low-refractive-index film was measured and the thickness d1 of the first layer was obtained, and the area At1 of the cross-section S1 of the first layer was obtained by calculation of d1×1000. As the thickness d1 of the first layer, when 70 nm≤dt≤400 nm was satisfied, d1=dt/2 was satisfied, and, when 400 nm<dt was satisfied, d1=200 nm was satisfied. The number Nv1 of voids each having a cross-sectional area of greater than or equal to 1000 $nm^2$ among voids included in the cross-section S1 of the first layer was counted, and the sum Av1 of cross-sectional areas of the voids each having the cross-sectional area of greater than or equal to 1000 $nm^2$ was calculated. Similarly, the area At2 (=(dt−d1)×1000) of the cross-section S2 of the second layer was calculated, the number Nv2 of voids each having a cross-sectional area of greater than or equal to 1000 $nm^2$ among voids included in the cross-section S2 of the second layer was counted, and the sum Av2 of cross-sectional areas of the voids each having the cross-sectional area of greater than or equal to 1000 $nm^2$ was calculated. The number Nv1 of the voids was divided by the area At1 to obtain the number density ρv1. In addition, the sum Av1 of the cross-sectional areas of the voids was divided by the area At1 to determine the void rate Vv1. In each of the Examples and the like, the transmission-photographed image of the laminate was obtained at three points distant from each other over 10 mm in the plane, each of the above-described parameters was obtained, and the average value thereof was adopted. As the number Nv of the voids and the void area ratio Vv [%], values obtained by truncating figures after decimal points were adopted. The above-described calculation and the like were performed by using image processing software ImageJ version 1.51 available from National Institutes of Health as necessary.

<Abrasion Resistance Test>

In a state where a load of 50 g/cm² was applied to the laminate of each of the Examples and the Comparative Examples by cotton cloth CLINT manufactured by Asahi Kasei Chemicals Corporation, the load was caused to reciprocate on the surface of the laminate five times. Thereafter, a reflectance was measured at the D line (wavelength=589 nm), and difference between reflectances before and after the abrasion resistance test was compared with each other. In a case where the difference $\Delta R_D$ in reflectance satisfied $\Delta R_D$/(reflectance $R_D$ at the D line before the abrasion resistance test)≤25%, the evaluation was "A". In a case where $\Delta R_D$/(reflectance $R_D$ at the D line before the abrasion resistance test)>25% was satisfied, the evaluation was "F".

Example 1

0.6 g of tetraethoxysilane (TEOS) (manufactured by Tokyo Chemical Industry Co., Ltd.), 1.18 g of methyltriethoxysilane (MTES) (manufactured by Tokyo Chemical Industry Co., Ltd.), 0.82 g of 0.3 mass % of formic acid (manufactured by KISHIDA CHEMICAL CO., LTD.), 3 g of hollow-silica-particles-containing sol (manufactured by JGC Catalysts and Chemicals Ltd., Product name: THRULYA 4110), and 22.4 g of ethanol (manufactured by KISHIDA CHEMICAL CO., LTD.) were mixed and caused to react at 35° C. for three hours. The hollow-silica-particles-containing sol used therein contained a solvent, and 25 mass % of hollow silica was contained as a solid content, and the average particle diameter of the hollow silica particles in a number-based particle size distribution was about 50 nm. A shell formed of silica of the hollow silica particle had a thickness of 10 to 20 nm. The maximum size of the internal space in the hollow silica particle was about 10 to 30 nm. The hollow particles had a refractive index of 1.25. Thus, a liquid composition for a low-refractive-index film according to Example 1 was obtained. In the liquid composition for a low-refractive-index film according to Example 1, in terms of silica, a content of a solid content derived from the TEOS was 0.6 mass %, a content of methyl silsesquioxane (MeSq) as a solid content derived from the MTES was 1.6 mass %, and a content of the hollow silica particles was 2.6 mass %. In a solid content of the liquid composition for a low-refractive-index film according to Example 1, a content of silica derived from the TEOS was 13% by mass, a content of MeSq derived from the MTES was 33% by mass, and a content of the hollow silica particles was 54% by mass. As the content of the hollow silica particles, a solid content in the hollow-silica-particles-containing sol was obtained as 25 mass % on the assumption that the solid content was the hollow silica particles. MTES and TEOS were added in preparation of the liquid composition for a low-refractive-index film according to Example 1 such that a ratio of a substance amount of MTES to a substance amount of TEOS was 7/3.

An ultrasonic washing machine (manufactured by Emerson Japan, Ltd., Type: Bransonic 5510-J-DTH, output: 135 W) was used to wash a glass substrate (size: 40 mm×40 mm, thickness: 1 mm, article having both surfaces polished, refractive index: 1.52) formed of soda-lime glass, in ultra- pure water, for 15 minutes. Thereafter, the glass substrate was washed in a commercially available alkaline washing liquid (2% diluent of SemiClean L.G.L, manufactured by YOKOHAMA OILS & FATS INDUSTRY CO. LTD.) for 15 minutes, and was subsequently washed in ultrapure water for 15 minutes. Thereafter, a corona surface treatment device (manufactured by Shinko Electric & Instrumentation Co., Ltd., Type: CoronaMaster PS-1M) was used to perform corona treatment of the surface of the glass substrate with output of 14 kV. After the corona treatment, the contact angle of a water droplet on the surface of the glass substrate was 2°. The glass substrate was stored for 12 hours in a clean bench which was for class of less than 100 and was maintained in a condition that a temperature was 23 to 25° C. and a relative humidity was 50 to 60%. Thus, a substrate of Example 1 was produced. As indicated in Table 1, the contact angle of a water droplet on the surface of the substrate of Example 1 was 32°, and the arithmetic average roughness Ra of the surface of the substrate of Example 1 was 0.5 nm. The contact angle of the water droplet was measured by using a contact angle meter manufactured by ASUMI GIKEN, Limited. The arithmetic average roughness Ra was determined in accordance with JIS B 0601-1994 based on a measurement result obtained by using an atomic force microscope SPI3700 manufactured by Seiko Instruments & Electronics Ltd. in a cyclic contact mode. The same applies to other Examples and Comparative Examples.

The liquid composition for a low-refractive-index film according to Example 1 was applied to one principal surface of the substrate of Example 1 by a spin coating method, to form a coating film. The coating film had superior uniform outer appearance. Thereafter, the substrate having the coating film formed thereon was placed in an oven maintained at 200° C. for 10 minutes to dry the coating film, whereby a low-refractive-index film of Example 1 was obtained. Thus, a laminate of Example 1 including the substrate and the low-refractive-index film formed on the substrate was obtained. According to observation of the outer appearance of the low-refractive-index film of Example 1, the thickness was constant. The face, of the substrate of the laminate of Example 1, on which the low-refractive-index film was not formed was polished to form a matte surface, and the spectral reflectance was thereafter measured. At the D line (wavelength of 589 nm) of the laminate of Example 1, the reflectance was obtained as 0.53%, the film thickness of the low-refractive-index film of Example 1 was obtained as 121 nm, and the refractive index was obtained as 1.16. In the low-refractive-index film of Example 1, the masses of silica and silsesquioxane forming the binder and the mass of the hollow silica particles were obtained on the assumption that each mass was equal to the mass of the corresponding component contained in the solid content of the liquid composition of Example 1. Table 2 indicates the results.

Example 2

A liquid composition for a low-refractive-index film according to Example 2 was prepared in the same manner as for Example 1 except for the following points. The amounts of TEOS, MTES, and hollow-silica-particles-containing sol to be added were adjusted such that a ratio of a mass of each component to a mass of the low-refractive-index film was a value indicated in Table 2 on the assumption that a ratio of a mass of each component to a mass of the whole solid content in the liquid composition for the low-refractive-index film was equal to the ratio of the mass of each component to the mass of the low-refractive-index film.

0.6 g of tetraethoxysilane (TEOS) (manufactured by Tokyo Chemical Industry Co., Ltd.), 1.18 g of methyltriethoxysilane (MTES) (manufactured by Tokyo Chemical Industry Co., Ltd.), 0.82 g of 0.3 mass % of formic acid (manufactured by KISHIDA CHEMICAL CO., LTD.), and 22.4 g of ethanol (manufactured by KISHIDA CHEMICAL CO., LTD.) were mixed and caused to react at 35° C. for three hours. Thereafter, ethanol was added to the obtained liquid, and the total of solid contents of silica derived from the TEOS and methyl silsesquioxane (MeSq) derived from the MTES was adjusted to 3 mass % to obtain a liquid composition B for an underlayer.

The liquid composition B for an underlayer was applied to one principal surface of a glass substrate (size: 40 mm×40 mm, thickness: 1 mm, refractive index: 1.52) which was formed of float glass and was previously washed by alkaline washing, by a spin coating method, to form a coating film. Subsequently, the coating film was dried in an oven at 200° C. for 10 minutes, to form an underlayer B2. A substrate of Example 2 was obtained. The thickness of the underlayer B2 was 13 nm. The contact angle of a water droplet on the surface of the underlayer B2 was 45°, and the arithmetic average roughness Ra of the surface of the underlayer B2 was 17 nm.

The liquid composition for a low-refractive-index film according to Example 2 was applied to the surface of the underlayer B2 of the substrate of Example 2 by a spin coating method, to form a coating film. The coating film had superior uniform outer appearance immediately after the application. Thereafter, the substrate of Example 2 was placed in an oven maintained at 200° C. for 10 minutes to dry the coating film, whereby a low-refractive-index film of Example 2 was formed. Thus, a laminate of Example 2 including the substrate and the low-refractive-index film formed on the substrate was obtained. According to observation of the outer appearance of the low-refractive-index film of Example 2, the low-refractive-index film of Example 2 had a constant thickness. The face, of the substrate of the laminate of Example 2, on which the low-refractive-index film was not formed, was polished to form a matte surface, and the spectral reflectance was thereafter measured. The film thickness of the underlayer B2 was around 10 nm, and the refractive index thereof was hardly different from that of the glass as the substrate, and, therefore, the underlayer B2 was considered to exert little influence on the reflectance of the laminate. According to calculation from the obtained spectral reflectance, at the D line of the laminate, the reflectance was less than or equal to 0.1%, the film thickness of the low-refractive-index film of Example 2 was 121 nm, and the refractive index was 1.23. The low-refractive-index film of Example 2 contained 23% by mass of silica forming the binder, 57% by mass of silsesquioxane, and 20% by mass of the hollow silica particles.

Example 3

A liquid composition for a low-refractive-index film according to Example 3 was prepared in the same manner as for Example 1 except for the following points. The amounts of TEOS, MTES, and hollow-silica-particles-containing sol to be added were adjusted such that a ratio of a mass of each component to a mass of the low-refractive-index film was a value indicated in Table 2 on the assumption that a ratio of a mass of each component to a mass of the whole solid content in the liquid composition for the low-refractive-index film was equal to the ratio of the mass of each component to the mass of the low-refractive-index film.

The same liquid composition B for an underlayer as that of Example 2 was applied to both principal surfaces of a glass substrate (size: 40 mm×40 mm, thickness: 1 mm, refractive index: 1.52) which was formed of float glass and was previously washed by alkaline washing, by a spin coating method, to form a coating film. Subsequently, the coating film was dried in an oven at 200° C. for 10 minutes, to form underlayers B3, whereby a substrate of Example 3 was obtained. The thickness of the underlayer B3 was 13 nm. The contact angle of a water droplet on the surface of the underlayer B3 was 43°, and the arithmetic average roughness Ra of the surface of the underlayer B3 was 11 nm.

The liquid composition for a low-refractive-index film according to Example 3 was applied to the surfaces of the underlayers B3 of the substrate of Example 3 by a spin coating method, to form a coating film. The coating film had superior uniform outer appearance immediately after the application. Thereafter, the substrate of Example 3 was placed in an oven maintained at 200° C. for 10 minutes to dry the coating film, whereby a low-refractive-index film of Example 3 was formed. Thus, a laminate of Example 3 including the substrate and the low-refractive-index film formed on the substrate was obtained. According to observation of the outer appearance of the low-refractive-index film of Example 3, the low-refractive-index film of Example 3 had a constant thickness. As in the same manner as for Example 1, the spectral reflectance of the laminate of Example 3 was measured, and each parameter was thereafter calculated. At the D line of the laminate of Example 3, the reflectance was 0.25%, the film thickness of the low-refractive-index film of Example 3 was 120 nm, and the refractive index was 1.19. The low-refractive-index film of Example 3 contained 19% by mass of silica forming the binder, 51% by mass of silsesquioxane, and 30% by mass of the hollow silica particles.

Example 4

A liquid composition for a low-refractive-index film according to Example 4 was prepared in the same manner as for Example 1 except for the following points. The amounts of TEOS, MTES, and hollow-silica-particles-containing sol to be added were adjusted such that a ratio of a mass of each component to a mass of the low-refractive-index film was a value indicated in Table 2 on the assumption that a ratio of a mass of each component to a mass of the whole solid content in the liquid composition for the low-refractive-index film was equal to the ratio of the mass of each component to the mass of the low-refractive-index film.

The same liquid composition B for an underlayer as that of Example 2 was applied to one principal surface of a glass substrate (size: 40 mm×40 mm, thickness: 1 mm, refractive index: 1.52) which was formed of float glass and was previously washed by alkaline washing, by a spin coating method, to form a coating film. Subsequently, the coating film was dried in an oven at 200° C. for 10 minutes, to form an underlayer B4, whereby a substrate of Example 4 was obtained. The thickness of the underlayer B4 was 11 nm. The contact angle of a water droplet on the surface of the underlayer B4 was 42°, and the arithmetic average roughness Ra of the surface of the underlayer B4 was 13 nm.

The liquid composition for a low-refractive-index film according to Example 4 was applied to the surface of the underlayer B4 of the substrate of Example 4 by a spin coating method, to form a coating film. The coating film had superior uniform outer appearance immediately after the application. Thereafter, the substrate of Example 4 was placed in an oven maintained at 200° C. for 10 minutes to dry the coating film, whereby a low-refractive-index film of Example 4 was formed. Thus, a laminate of Example 4 including the substrate and the low-refractive-index film formed on the substrate was obtained. According to observation of the outer appearance of the low-refractive-index film of Example 4, the low-refractive-index film of Example 4 had a constant thickness. As in the same manner as for Example 1, the spectral reflectance of the laminate of Example 4 was measured, and each parameter was thereafter calculated. At the D line of the laminate of Example 4, the reflectance was 0.62%, the film thickness of the low-refractive-index film of Example 4 was 123 nm, and the refractive index was 1.15. The low-refractive-index film of Example 4 contained 17% by mass of silica forming the binder, 43% by mass of silsesquioxane, and 40% by mass of the hollow silica particles.

Example 5

A liquid composition for a low-refractive-index film according to Example 5 was prepared in the same manner as for Example 1 except for the following points. The amounts of TEOS, MTES, and hollow-silica-particles-containing sol to be added were adjusted such that a ratio of a mass of each component to a mass of the low-refractive-index film was a value indicated in Table 2 on the assumption that a ratio of a mass of each component to a mass of the whole solid content in the liquid composition for the low-refractive-index film was equal to the ratio of the mass of each component to the mass of the low-refractive-index film.

The same liquid composition B for an underlayer as that of Example 2 was applied to one principal surface of a glass substrate (size: 40 mm×40 mm, thickness: 1 mm, refractive index: 1.52) which was formed of float glass and was previously washed by alkaline washing, by a spin coating method, to form a coating film. Subsequently, the coating film was dried in an oven at 200° C. for 10 minutes, to form an underlayer B5, whereby a substrate of Example 5 was obtained. The thickness of the underlayer B5 was 11 nm. The contact angle of a water droplet on the surface of the underlayer B5 was 44°, and the arithmetic average roughness Ra of the surface of the underlayer B5 was 16 nm.

The liquid composition for a low-refractive-index film according to Example 5 was applied to the surface of the underlayer B5 of the substrate of Example 5 by a spin coating method, to form a coating film. The coating film had superior uniform outer appearance immediately after the application. Thereafter, the substrate of Example 5 was placed in an oven maintained at 200° C. for 10 minutes to dry the coating film, whereby a low-refractive-index film of Example 5 was formed. Thus, a laminate of Example 5 including the substrate and the low-refractive-index film formed on the substrate was obtained. According to observation of the outer appearance of the low-refractive-index film of Example 5, the low-refractive-index film of Example 5 had a constant thickness. As in the same manner as for Example 1, the spectral reflectance of the laminate of Example 5 was measured, and each parameter was thereafter calculated. At the D line of the laminate of Example 5, the reflectance was 1.13%, the film thickness of the low-refractive-index film of Example 5 was 121 nm, and the refractive index was 1.12. The low-refractive-index film of Example 5 contained 14% by mass of silica forming the binder, 36% by mass of silsesquioxane, and 50% by mass of the hollow silica particles.

Example 6

A liquid composition for a low-refractive-index film according to Example 6 was prepared in the same manner as for Example 1 except for the following points. The amounts of TEOS, MTES, and hollow-silica-particles-containing sol to be added were adjusted such that a ratio of a mass of each component to a mass of the low-refractive-index film was a value indicated in Table 2 on the assumption that a ratio of a mass of each component to a mass of the whole solid content in the liquid composition for the low-refractive-index film was equal to the ratio of the mass of each component to the mass of the low-refractive-index film.

The same liquid composition B for an underlayer as that of Example 2 was applied to both principal surfaces of a glass substrate (size: 40 mm×40 mm, thickness: 1 mm, refractive index: 1.52) which was formed of float glass and was previously washed by alkaline washing, by a spin coating method, to form a coating film. Subsequently, the coating film was dried in an oven at 200° C. for 10 minutes to form underlayers B6, whereby a substrate of Example 6 was obtained. The thickness of the underlayer B6 was 14 nm. The contact angle of a water droplet on the surface of the underlayer B6 was 41°, and the arithmetic average roughness Ra of the surface of the underlayer B6 was 12 nm.

The liquid composition for a low-refractive-index film according to Example 6 was applied to the surfaces of the underlayers B6 of the substrate of Example 6 by a spin coating method, to form a coating film. The coating film had superior uniform outer appearance immediately after the application. Thereafter, the substrate of Example 6 was placed in an oven maintained at 200° C. for 10 minutes to dry the coating film, whereby a low-refractive-index film of Example 6 was formed. Thus, a laminate of Example 6 including the substrate and the low-refractive-index film formed on the substrate was obtained. According to observation of the outer appearance of the low-refractive-index film of Example 6, the low-refractive-index film of Example 6 had a constant thickness. As in the same manner as for Example 1, the spectral reflectance of the laminate of Example 6 was measured, and each parameter was thereafter calculated. At the D line of the laminate of Example 6, the reflectance was 1.50%, the film thickness of the low-refractive-index film of Example 6 was 122 nm, and the refractive index was 1.10. The low-refractive-index film of Example 6 contained 8% by mass of silica forming the binder, 22% by mass of silsesquioxane, and 70% by mass of the hollow silica particles.

Example 7

To 3 g of n-octyltrichlorosilane (manufactured by Tokyo Chemical Industry Co., Ltd.), 97 g of ethanol was added, whereby a liquid composition C for an underlayer was obtained.

The liquid composition C for an underlayer was applied to one principal surface of a glass substrate (size: 40 mm×40 mm, thickness: 1 mm, refractive index: 1.52) which was formed of float glass and was previously washed by alkaline washing, by a spin coating method, to form a coating film. Subsequently, the coating film was dried in an oven at 200° C. for 10 minutes to form an underlayer C7, whereby a substrate of Example 7 was obtained. The thickness of the underlayer C7 was 13 nm. The contact angle of a water droplet on the surface of the underlayer C7 was 64°, and the arithmetic average roughness Ra of the surface of the underlayer C7 was 23 nm.

The same liquid composition for a low-refractive-index film as that of Example 1 was applied to the surface of the underlayer C7 of the substrate of Example 7 by a spin coating method, to form a coating film. The coating film had superior uniform outer appearance immediately after the application. Thereafter, the substrate of Example 7 was placed in an oven maintained at 200° C. for 10 minutes to dry the coating film, whereby a low-refractive-index film of Example 7 was formed. Thus, a laminate of Example 7 including the substrate and the low-refractive-index film formed on the substrate was obtained. According to observation of the outer appearance of the low-refractive-index film of Example 7, the low-refractive-index film of Example 7 had a constant thickness. As in the same manner as for Example 1, the spectral reflectance of the laminate of Example 7 was measured, and each parameter was thereafter calculated. At the D line of the laminate of Example 7, the reflectance was 0.45%, the film thickness of the low-refractive-index film of Example 7 was 119 nm, and the refractive index was 1.17. The low-refractive-index film of Example 7 contained 13% by mass of silica forming the binder, 33% by mass of silsesquioxane, and 54% by mass of the hollow silica particles.

Example 8

To 3 g of 1H,1H,2H,2H-perfluorooctyltrichlorosilane (manufactured by Tokyo Chemical Industry Co., Ltd.), 97 g of ethanol was added, whereby a liquid composition D for an underlayer was obtained.

The liquid composition D for an underlayer was applied to one principal surface of a glass substrate (size: 40 mm×40 mm, thickness: 1 mm, refractive index: 1.52) which was formed of float glass and was previously washed by alkaline washing, by a spin coating method, to form a coating film. Subsequently, the coating film was dried in an oven at 200° C. for 10 minutes to form an underlayer D8, whereby a substrate of Example 8 was obtained. The thickness of the underlayer D8 was 11 nm. The contact angle of a water droplet on the surface of the underlayer D8 was 118°, and the arithmetic average roughness Ra of the surface of the underlayer D8 was 35 nm.

The same liquid composition for a low-refractive-index film as that of Example 1 was applied to the surface of the underlayer D8 of the substrate of Example 8 by a spin coating method, to form a coating film. The coating film had superior uniform outer appearance immediately after the application. Thereafter, the substrate of Example 8 was placed in an oven maintained at 200° C. for 10 minutes to dry the coating film, whereby a low-refractive-index film of Example 8 was formed. Thus, a laminate of Example 8 including the substrate and the low-refractive-index film formed on the substrate was obtained. According to observation of the outer appearance of the low-refractive-index film of Example 8, the low-refractive-index film of Example 8 had a constant thickness. As in the same manner as for Example 1, the spectral reflectance of the laminate of Example 8 was measured, and each parameter was thereafter calculated. At the D line of the laminate of Example 8, the reflectance was 0.55%, the film thickness of the low-refractive-index film of Example 8 was 120 nm, and the refractive index was 1.16. The low-refractive-index film of Example 8 contained 13% by mass of silica forming the binder, 33% by mass of silsesquioxane, and 54% by mass of the hollow silica particles.

Example 9

A substrate (available from AS ONE Corporation, Product No.: PCC0050503, size: 40 mm×40 mm, thickness: 1 mm, refractive index: 1.59) made of polycarbonate (PC) was washed in ultrapure water by using an ultrasonic washing machine for 15 minutes. Thereafter, the substrate made of PC was washed with a commercially available alkaline washing liquid for 15 minutes, and further washed in ultrapure water for 15 minutes. Subsequently, in the same method and condition as those of Example 1, a corona surface treatment device (manufactured by Shinko Electric & Instrumentation Co., Ltd, Type: CoronaMaster PS-1M) was used to perform corona treatment of the surface of the substrate made of PC with output of 14 kV for 10 minutes to obtain a substrate of Example 9. The contact angle of a water droplet on the surface of the substrate made of PC after the corona treatment was 19°, and the arithmetic average roughness Ra of the surface of the substrate made of PC after the corona treatment was 34 nm.

The same liquid composition for a low-refractive-index film as that of Example 1 was applied to one principal surface of the substrate of Example 9 by a spin coating method. The coating film had superior uniform outer appearance immediately after the application. Thereafter, the substrate of Example 9 was placed in an oven maintained at 200° C. for 10 minutes to dry the coating film, whereby a low-refractive-index film of Example 9 was formed. Thus, a laminate of Example 9 including the substrate and the low-refractive-index film formed on the substrate was obtained. According to observation of the outer appearance of the low-refractive-index film of Example 9, the low-refractive-index film of Example 9 had a constant thickness. As in the same manner as for Example 1, the spectral reflectance of the laminate of Example 9 was measured, and each parameter was thereafter calculated. At the D line of the laminate of Example 9, the reflectance was 0.57%, the film thickness of the low-refractive-index film of Example 9 was 122 nm, and the refractive index was 1.18. The low-refractive-index film of Example 9 contained 13% by mass of silica forming the binder, 33% by mass of silsesquioxane, and 54% by mass of the hollow silica particles.

Example 10

The same kind of substrate as the substrate made of PC and used in Example 9 was washed in ultrapure water by using an ultrasonic washing machine for 15 minutes. Thereafter, the substrate made of PC was washed with a commercially available alkaline washing liquid for 15 minutes, and further washed in ultrapure water for 15 minutes. Subsequently, corona treatment was performed in the same method and condition as those of Example 1 except that the treatment time was adjusted to one minute, to obtain a substrate of Example 10. The contact angle of a water droplet on the surface of the substrate made of PC after the corona treatment was 37°, and the arithmetic average roughness Ra of the surface of the substrate made of PC after the corona treatment was 27 nm.

The same liquid composition for a low-refractive-index film as that of Example 1 was applied to one principal surface of the substrate of Example 10 by a spin coating method. The coating film had superior uniform outer appearance immediately after the application. Thereafter, the substrate of Example 10 was placed in an oven maintained at 200° C. for 10 minutes to dry the coating film, whereby a low-refractive-index film of Example 10 was formed. Thus, a laminate of Example 10 including the substrate and the low-refractive-index film formed on the substrate was obtained. According to observation of outer appearance of the low-refractive-index film of Example 10, the low-refractive-index film of Example 10 had a constant thickness. As in the same manner as for Example 1, the spectral reflectance of the laminate of Example 10 was measured, and each parameter was thereafter calculated. At the D line of the laminate of Example 10, the reflectance was 0.73%, the film thickness of the low-refractive-index film of Example 10 was 121 nm, and the refractive index was 1.17. As indicated in Table 2, the low-refractive-index film of Example 10 contained 13% by mass of silica forming the binder, 33% by mass of silsesquioxane, and 54% by mass of the hollow silica particles.

Example 11

The same kind of substrate as the substrate made of PC and used in Example 9 was washed in ultrapure water by using an ultrasonic washing machine for 15 minutes. Thereafter, the substrate made of PC was washed with a commercially available alkaline washing liquid for 15 minutes, and further washed in ultrapure water for 15 minutes to obtain a substrate of Example 11. The contact angle of a water droplet on the surface of the substrate of Example 11 was 71°, and the arithmetic average roughness Ra of the surface of the substrate of Example 11 was 21 nm.

The same liquid composition for a low-refractive-index film as that of Example 1 was applied to one principal surface of the substrate of Example 11 by a spin coating method. The coating film had superior uniform outer appearance immediately after the application. Thereafter, the substrate of Example 11 was placed in an oven maintained at 200° C. for 10 minutes to dry the coating film, whereby a low-refractive-index film of Example 11 was formed. Thus, a laminate of Example 11 including the substrate and the low-refractive-index film formed on the substrate was obtained. According to observation of outer appearance of the low-refractive-index film of Example 11, the low-refractive-index film of Example 11 had a constant thickness. As in the same manner as for Example 1, the spectral reflectance of the laminate of Example 11 was measured, and each parameter was thereafter calculated. At the D line of the laminate of Example 11, the reflectance was 0.84%, the film thickness of the low-refractive-index film of Example 11 was 123 nm, and the refractive index was 1.16. As indicated in Table 2, the low-refractive-index film of Example 11 contained 13% by mass of silica forming the binder, 33% by mass of silsesquioxane, and 54% by mass of the hollow silica particles.

Comparative Example 1

While 99.5 g of decamethylcyclopentasiloxane (manufactured by Shin-Etsu Chemical Co., Ltd., Product name KF-995) was stirred, 0.5 g of tetrachlorosilane ($SiCl_4$) manufactured by Shin-Etsu Chemical Co., Ltd was added to the decamethylcyclopentasiloxane to prepare a composition E1 for an underlayer containing silica as a main component. In addition, while 98 g of decamethylcyclopentasiloxane was stirred, 2 g of heptadecafluorodecyltrichlorosilane ($CF_3(CF_2)_7(CH_2)_2SiCl_3$) was added to the decamethylcyclopentasiloxane to prepare a composition E2 for an underlayer.

The composition E1 for an underlayer was applied, by a flow-coating method, to one principal surface of a glass substrate (size: 40 mm×40 mm, thickness: 1 mm, refractive index: 1.52) which was formed of float glass and was previously washed by alkaline washing in an environment in which the temperature was 25° C. and the relative humidity was 30%, to form a coating film, and the coating film was left stationary in a wet state for one minute. Subsequently, the composition E1 for an underlayer was applied onto the coating film by a flow-coating method in the same conditions, and the coated object was left stationary in a wet state for one minute. Subsequently, the composition E2 for an underlayer was applied onto the wet coating film, of the composition E1 for an underlayer, positioned on the surface of the glass substrate by a flow-coating method in the same conditions as described above, and the coated object was left stationary in a wet state for one minute. Subsequently, an excess component, of the composition for an underlayer, on the surface was completely washed away with ethyl alcohol, and the coating film was naturally dried to form an underlayer E14, whereby a substrate of Comparative Example 1 was obtained. The underlayer E14 had water repellency exhibited by the action of the composition E2 for the underlayer. In addition, particulate-like protrusions and columnar protrusions were confirmed to be formed on the surface of the underlayer E14 by the action of the composition E1 for the underlayer. The thickness of the underlayer E14 was 14 nm. The contact angle of a water droplet on the surface of the underlayer E14 was 157° and the arithmetic average roughness Ra of the surface of the underlayer E14 was 43 nm.

A liquid composition for a low-refractive-index film of Comparative Example 1 was applied to the surface of the underlayer E14 of the substrate of Comparative Example 1 by a spin coating method. However, streaky coating variation occurred over the surface of the face of the substrate of Comparative Example 1 and a uniform film was not obtained.

Comparative Example 2

0.6 g of tetraethoxysilane (TEOS) (manufactured by Tokyo Chemical Industry Co., Ltd.), 1.18 g of methyltriethoxysilane (MTES) (manufactured by Tokyo Chemical Industry Co., Ltd.), 0.82 g of 0.3 mass % of formic acid (manufactured by KISHIDA CHEMICAL CO., LTD.), 3 g of silica sol (manufactured by Nissan Chemical Corporation, Product name: SNOWTEX MP-2040, average particle diameter: 200 nm), and 22.4 g of ethanol (manufactured by KISHIDA CHEMICAL CO., LTD.) were mixed and caused to react at 35° C. for three hours. Ethanol was added to the obtained liquid, and the total of solid contents of silica derived from the tetraethoxysilane and methyl silsesquioxane (MeSq) derived from the methyltriethoxysilane was adjusted to 5 mass % to obtain a liquid composition F for an underlayer.

The liquid composition F for an underlayer was applied to one principal surface of a glass substrate (size: 40 mm×40 mm, thickness: 1 mm, refractive index: 1.52) which was formed of float glass and was previously washed by alkaline washing, by a spin coating method, to form a coating film. Subsequently, the coating film was dried in an oven at 200° C. for 10 minutes to form an underlayer F15, whereby a substrate of Comparative Example 2 was obtained. The thickness of the underlayer F15 was 170 nm. The contact angle of a water droplet on the surface of the underlayer F15 was 52°, and the arithmetic average roughness Ra of the surface of the underlayer F15 was 150 nm.

A liquid composition for a low-refractive-index film according to Comparative Example 1 was applied to the surface of the underlayer F15 of the substrate of Comparative Example 2 by a spin coating method. However, streaky coating variation occurred over the surface of the face of the substrate of Comparative Example 2 and a uniform film was not obtained.

TABLE 1

| | | Pretreatment | | Underlayer | | | Parameter of surface | |
|---|---|---|---|---|---|---|---|---|
| | Material of substrate | Alkaline washing | Corona treatment [minutes] | Kind | Film thickness [nm] | Storage time [hours] | Arithmetic average roughness Ra [nm] | Contact angle of water droplet [°] |
| Example 1 | glass | o | 10 | — | — | 12 | 0.5 | 32 |
| Example 2 | glass | o | — | B2 | 13 | — | 17 | 45 |
| Example 3 | glass | o | — | B3 | 13 | — | 11 | 43 |
| Example 4 | glass | o | — | B4 | 11 | — | 13 | 42 |
| Example 5 | glass | o | — | B5 | 11 | — | 16 | 44 |
| Example 6 | glass | o | — | B6 | 14 | — | 12 | 41 |
| Example 7 | glass | o | — | C7 | 13 | — | 23 | 64 |
| Example 8 | glass | o | — | D8 | 11 | — | 35 | 118 |
| Example 9 | PC | o | 10 | — | — | — | 34 | 19 |
| Example 10 | PC | o | 1 | — | — | — | 27 | 37 |
| Example 11 | PC | o | — | — | — | — | 21 | 71 |
| Comparative Example 1 | glass | o | — | E14 | 14 | — | 43 | 157 |
| Comparative Example 2 | glass | o | — | F15 | 170 | — | 150 | 52 |

TABLE 2

| | Laminate/Low-refractive-index film | | | | | | | | | | | |
|---|---|---|---|---|---|---|---|---|---|---|---|---|
| | Hollow particles | Binder | | | | Void | | Optical characteristics | | | | |
| Example | Mass ratio Whp [mass %] | Silica mass ratio [mass %] | MeSq Mass ratio [mass %] | Wb [mass %] | Binder/ Hollow particles Wb/Whp | ρv1 [/μm²] | Vv1 [%] | Reflectance (D line) [%] | Refractive index (D line) | Haze [%] | Film thickness [nm] | Film formability | Abrasion resistance |
| Example 1 | 54 | 13 | 33 | 46 | 0.85 | 19 | 36 | 0.53 | 1.16 | 0.1 | 121 | A | A |
| Example 2 | 20 | 23 | 57 | 80 | 4.00 | 8 | 9 | 0.1≥ | 1.23 | 0.2 | 121 | A | A |
| Example 3 | 30 | 19 | 51 | 70 | 2.33 | 13 | 26 | 0.25 | 1.19 | 0.4 | 120 | A | A |
| Example 4 | 40 | 17 | 43 | 60 | 1.50 | 42 | 42 | 0.62 | 1.15 | 0.3 | 123 | A | A |
| Example 5 | 50 | 14 | 36 | 50 | 1.00 | 62 | 53 | 1.13 | 1.12 | 0.4 | 121 | A | A |
| Example 6 | 70 | 8 | 22 | 30 | 0.43 | 83 | 61 | 1.50 | 1.10 | 0.3 | 122 | A | A |
| Example 7 | 54 | 13 | 33 | 46 | 0.85 | 18 | 32 | 0.45 | 1.17 | 0.2 | 119 | A | A |
| Example 8 | 54 | 13 | 33 | 46 | 0.85 | 24 | 36 | 0.55 | 1.16 | 0.2 | 120 | A | A |
| Example 9 | 54 | 13 | 33 | 46 | 0.85 | 16 | 29 | 0.57 | 1.18 | 0.3 | 122 | A | A |
| Example 10 | 54 | 13 | 33 | 46 | 0.85 | 21 | 34 | 0.73 | 1.17 | 0.4 | 121 | A | A |
| Example 11 | 54 | 13 | 33 | 46 | 0.85 | 23 | 36 | 0.84 | 1.16 | 0.2 | 123 | A | A |
| Comparative Example 1 | 54 | 13 | 33 | 46 | 0.85 | 36 | 41 | — | — | 0.4 | 121 | F | A |
| Comparative Example 2 | 54 | 13 | 33 | 46 | 0.85 | 32 | 43 | — | — | 5.2 | 120 | F | F |

The invention claimed is:

1. A low-refractive-index film comprising a first layer and a second layer,
   the low-refractive-index film being configured to be provided on or above a substrate with the first layer between the second layer and the substrate,
   the low-refractive-index film having a refractive index greater than or equal to 1.01 and less than or equal to 1.25,
   the first layer and the second layer each including:
   hollow particles
   a binder, and
   a plurality of voids each with cross-sectional area of 1000 nm² or more in a cross-sectional view,
   the first layer having a thickness less than or equal to half a thickness of the low-refractive-index film and less than or equal to 200 nm,
   the first layer having a first number density of the voids in a cross section view of the first layer,
   the second layer having a second number density of the voids in a cross section view of the second layer,
   the first number density being 13/μm² or more and 100/μm² or less, and
   the first number density being greater than the second number density.

2. The low-refractive-index film according to claim 1,
   the first layer further having a first ratio of the total cross-sectional area of voids with each cross-sectional area of 1000 nm² or more to the cross-sectional area of the first layer,
   the second layer further having a second ratio of the total cross-sectional area of voids with each cross-sectional area of 1000 nm² or more to the cross-sectional area of the second layer,
   the first ratio being 26% or more and 70% or less, and
   the first ratio being greater than the second ratio.

3. The low-refractive-index film according to claim 1,
   the low-refractive-index film having a thickness dt of greater than or equal to 70 nm, wherein a thickness d1 of the first layer equals dt/2 in a first case of 70 nm≤dt≤400 nm or 200 nm in a second case of 400 nm<dt.

4. The low-refractive-index film according to claim 1, wherein an average particle diameter of the hollow particles is greater than or equal to 20 nm and less than or equal to 100 nm.

5. The low-refractive-index film according to claim 1, wherein a ratio of a content of the binder to a content of the hollow particles is greater than or equal to 0.2 and less than or equal to 20 on a mass basis.

6. A laminate sequentially comprising
a substrate, and
the low-refractive-index film according to claim 1.

7. The laminate according to claim 6, wherein an arithmetic average roughness, of a surface of the substrate, determined in accordance with Japanese Industrial Standards (JIS) B 0601-1994 is greater than or equal to 0.3 nm and less than or equal to 140 nm.

8. The laminate according to claim 6, wherein a contact angle of a water droplet on a surface of the substrate is greater than or equal to 5° and less than or equal to 140°.

9. The laminate according to claim 6, the laminate further comprising an underlayer forming a surface of the substrate.

10. The laminate according to claim 9, wherein the underlayer contains at least one selected from a group of silica and silsesquioxane.

11. The laminate according to claim 9, wherein the underlayer has a thickness of 5 to 50 nm.

12. A laminate comprising:
a substrate;
at least one selected from a group of an anti-fogging film, a water-repellent film, an oil-repellent film, and a hydrophilic film formed on the substrate; and
the low-refractive-index film according to claim 1.

13. An optical element comprising a surface formed by the low-refractive-index film according to claim 1.

14. A windshield comprising the low-refractive-index film according to claim 1.

15. A display device comprising the low-refractive-index film according to claim 1.

* * * * *